(12) United States Patent
Kim et al.

(10) Patent No.: US 12,188,281 B2
(45) Date of Patent: Jan. 7, 2025

(54) ANTI-STICKING SYSTEM OF INLET ACTUATOR

(71) Applicants: Hyundai Motor Company, Seoul (KR); Kia Corporation, Seoul (KR)

(72) Inventors: Seung Woo Kim, Anyang-si (KR); Dae Hyun Kim, Bucheon-si (KR); Dong Geon Lee, Mungyeong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 435 days.

(21) Appl. No.: 17/742,820

(22) Filed: May 12, 2022

(65) Prior Publication Data

US 2023/0151665 A1    May 18, 2023

(30) Foreign Application Priority Data

Nov. 15, 2021    (KR) .......................... 10-2021-0156742

(51) Int. Cl.
   *H01R 13/52*    (2006.01)
   *E05F 15/40*    (2015.01)
   *E05F 15/63*    (2015.01)

(52) U.S. Cl.
   CPC .............. *E05F 15/40* (2015.01); *E05F 15/63* (2015.01); *E05Y 2201/22* (2013.01); *E05Y 2201/626* (2013.01); *E05Y 2400/54* (2013.01); *E05Y 2900/534* (2013.01)

(58) Field of Classification Search
   CPC ...... E05F 15/40; E05F 15/63; E05Y 2201/22; E05Y 2201/626; E05Y 2400/54; E05Y 2900/534; H01R 13/6395; H01R 2201/26; H01R 13/62933; H01R 13/639; B60L 53/16; B60L 3/0092; B60L 53/18; Y02T 10/70; Y02T 10/7072; Y02T 90/14; B08B 5/02; B60Y 2200/91
   See application file for complete search history.

(56) References Cited

U.S. PATENT DOCUMENTS

| 11,180,045 | B2* | 11/2021 | Tsukamoto | H02J 7/0045 |
| 2011/0285349 | A1* | 11/2011 | Widmer | H02J 50/60 |
| | | | | 320/108 |
| 2012/0126747 | A1* | 5/2012 | Kiko | B60L 53/16 |
| | | | | 320/109 |
| 2019/0009680 | A1* | 1/2019 | Kauffmann | B60L 53/126 |
| 2019/0176633 | A1* | 6/2019 | Booth | B60L 53/60 |

(Continued)

FOREIGN PATENT DOCUMENTS

JP    2020061795 A    4/2020

*Primary Examiner* — Abdullah A Riyami
*Assistant Examiner* — Nelson R. Burgos-Guntin
(74) *Attorney, Agent, or Firm* — Slater Matsil, LLP

(57) ABSTRACT

An embodiment system includes an actuator mounted in a housing and configured to be operated in response to a connection state of a charging cable, a lever arm rotatably provided outside the housing and configured to be rotated in conjunction with operation of the actuator, a debris removal unit configured to remove debris on the lever arm, and a controller configured to control the operation of the actuator in response to the connection state of the charging cable being a connected state or a released state and to control the debris removal unit to remove the debris on the lever arm in response to an operational state according to the operation of the actuator deviating from a normal range.

20 Claims, 4 Drawing Sheets

(56) References Cited

U.S. PATENT DOCUMENTS

| | | | | |
|---|---|---|---|---|
| 2019/0176637 A1* | 6/2019 | Booth | ............... | H02J 7/0013 |
| 2020/0108729 A1* | 4/2020 | Tsukamoto | ............ | B60L 53/62 |
| 2022/0271551 A1* | 8/2022 | Smidebrant | ........... | H02H 3/087 |
| 2023/0151665 A1* | 5/2023 | Kim | .................. | E05F 15/40 |
| | | | | 49/26 |
| 2023/0322076 A1* | 10/2023 | Frank | ................ | B62D 23/005 |
| | | | | 180/273 |
| 2023/0339541 A1* | 10/2023 | Nysse | ................ | B62D 65/024 |
| 2023/0417183 A1* | 12/2023 | Orchard | .............. | B64D 45/00 |
| 2024/0247696 A1* | 7/2024 | Bortoli | ............... | F16D 65/0006 |

* cited by examiner

ANTI-STICKING SYSTEM OF INLET ACTUATOR

CROSS-REFERENCE TO RELATED APPLICATIONS

This application claims the benefit of Korean Patent Application No. 10-2021-0156742, filed on Nov. 15, 2021, which application is hereby incorporated herein by reference.

TECHNICAL FIELD

The present invention relates generally to an anti-sticking system of an inlet actuator.

BACKGROUND

Recently, an electric mobility, which is an eco-friendly vehicle, has been commercialized. Such an electric mobility is powered by a rechargeable battery system, and a battery charging system for charging electric power of the electric mobility is mounted in the electric mobility.

The electric mobility is designed such that when a charging plug connected to an external power source is connected thereto, a battery thereof can be charged by receiving power from the external power source.

The battery charging system includes a receptacle configured to receive the charging plug and interface with the charging plug. The interface between the charging plug and the receptacle of the electric vehicle may be of any standard configuration that allows current to be transmitted from a charging unit to the mobility and battery.

However, when an unauthorized person disconnects the charging plug while charging of the electric mobility is being performed, the charging cannot be continuously performed and the charging of the battery cannot be fully performed. In addition, damage to the electric mobility or the charging plug may occur when the charging plug is forcibly removed from the receptacle during charging operation due to the current flowing through the interface.

To solve the above problem, the electric mobility may include a locking device configured to secure the charging plug against removal from the receptacle.

The locking device is called an inlet actuator, and the inlet actuator is operated when the charging plug is connected to the receptacle to prevent the charging plug from being separated from the receptacle. Conversely, when the battery is fully charged and the charging plug is removed, the inlet actuator is operated and allows the charging plug to be removed.

However, when the inlet actuator is broken down or each component constituting the inlet actuator is stuck by debris, an action to mount or release the charging plug is not performed.

The foregoing is intended merely to aid in the understanding of the background of the present invention, and is not intended to mean that the present invention falls within the purview of the related art that is already known to those skilled in the art.

SUMMARY

The present invention relates generally to an anti-sticking system of an inlet actuator. Particular embodiments relate to an anti-sticking system of an inlet actuator in which the anti-sticking system is configured to prevent an inoperable situation of the inlet actuator from occurring when a lever operated in conjunction with the inlet actuator is stuck by ingress of debris.

Accordingly, embodiments of the present invention keep in mind problems occurring in the related art, and embodiments of the present invention provide an anti-sticking system of an inlet actuator, wherein when an inlet actuator provided for locking or releasing a charging plug is broken, a lever arm exposed outside a housing performs locking or releasing operation for the charging plug. Another embodiment of the present invention provides an anti-sticking system of an inlet actuator, the anti-sticking system being configured to prevent a lever arm from being stuck by debris to prevent an inoperable situation of the inlet actuator from being caused by sticking of the lever arm.

According to one embodiment of the present invention, there is provided an anti-sticking system of an inlet actuator, the anti-sticking system including an actuator mounted in a housing and configured to be operated in response to a connection state of a charging cable, a lever arm rotatably provided outside the housing and configured to be rotated in conjunction with operation of the actuator, a debris removal unit provided to remove debris generated on the lever arm, and a controller controlling operation of the actuator in response to connection or releasing of the charging cable, when an operational state according to the operation of the actuator deviates from a normal range, the controller controlling the debris removal unit so as to remove the debris generated on the lever arm.

The debris removal unit may be configured to jet compressed air to the lever arm.

A locking pin may be connected to the actuator and the locking pin may be locked or released to or from an inlet body in response to operation of the actuator, and a detection unit may be provided in the housing and configured to detect a location of the locking pin.

The locking pin may include a first detection contact part and a second detection contact part that may be spaced apart from each other in a longitudinal direction of the locking pin, and the detection unit may include a touch part arranged between the first detection contact part and the second detection contact part, and when the touch part is brought into contact with the first detection contact part, the detection unit may detect that the locking pin is located to be locked to the inlet body, and when the touch part is brought into contact with the second detection contact part, the detection unit may detect that the locking pin is located to be released from the inlet body.

The controller may preset the normal range of the operational state as a normal time range at a normal operational state of the actuator, and when the detection unit detects that an operation time for the locking pin to reach a locked state or a releasing state deviates from the normal time range, the controller may control the debris removal unit to remove the debris generated on the lever arm.

When the detection unit detects that an operation time for the locking pin to reach a locked state or a releasing state deviates from a normal time range, the controller may generate a warning message.

When the detection unit detects that an operation time for the locking pin to reach a locked state or a releasing state deviates from a normal time range, the controller may control the debris removal unit to increase operation of the debris removal unit in response to operation time outside the normal time range.

The controller may preset the normal range as a normal voltage range in a normal operational state of the actuator, and input a voltage value applied in operation of the actuator, and when the voltage value deviates from the normal voltage range, the controller may control the debris removal unit to remove debris generated on the lever arm.

When the voltage value deviates from the normal voltage range, the controller may control the debris removal unit to increase operation of the debris removal unit in response to the voltage value outside the normal voltage range.

When the operational state according to operation of the actuator after the debris removal unit is operated deviates from the normal range, the controller may send a warning message so as to perform an inspection including the lever arm.

According to the anti-sticking system of the inlet actuator having the structure described above, when the inlet actuator provided to lock or release the charging plug is broken down, the lever arm exposed outside the housing performs locking or releasing operation of the charging plug. Specifically, as debris generated between the lever arm and the housing is removed, sticking occurring by the debris is prevented and an inoperable situation of the inlet actuator is prevented.

BRIEF DESCRIPTION OF THE DRAWINGS

The above and other objectives, features, and other advantages of embodiments of the present invention will be more clearly understood from the following detailed description when taken in conjunction with the accompanying drawings, in which.

DETAILED DESCRIPTION OF ILLUSTRATIVE EMBODIMENTS

Hereinbelow, an anti-sticking system of an inlet actuator according to embodiments of the present invention will be described with reference to accompanying drawings.

Figure 1:
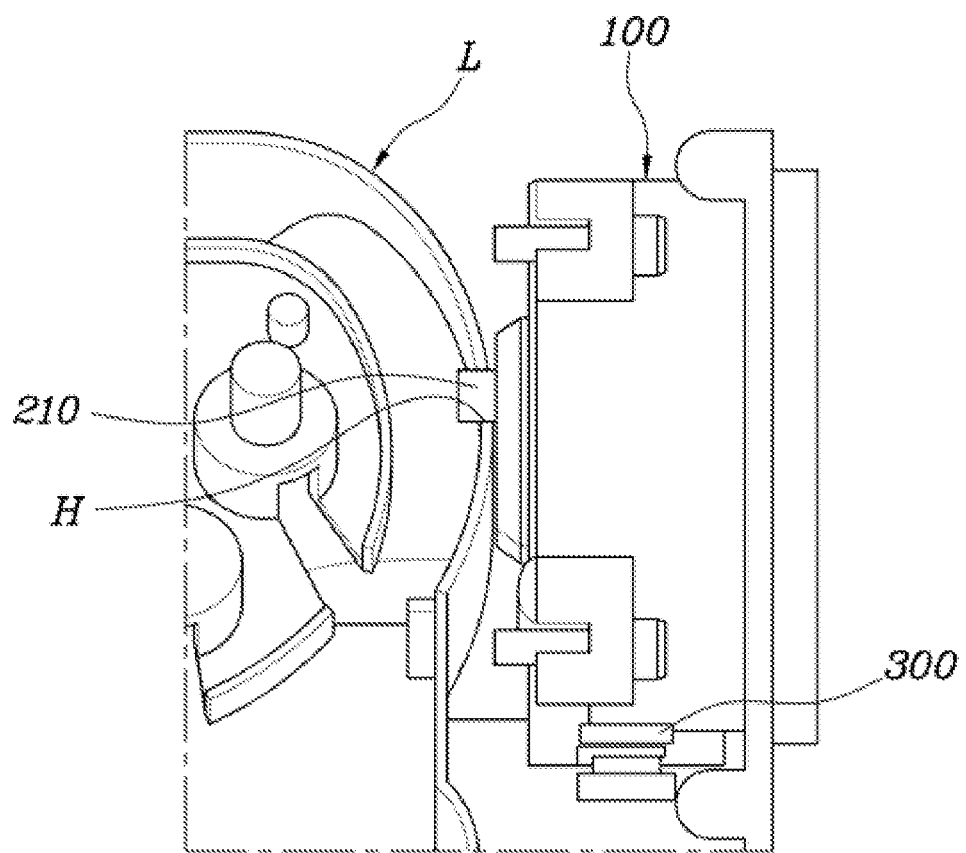
FIG. 1 is a view showing an inlet actuator and an inlet body according to embodiments of the present invention.
Figure 2:
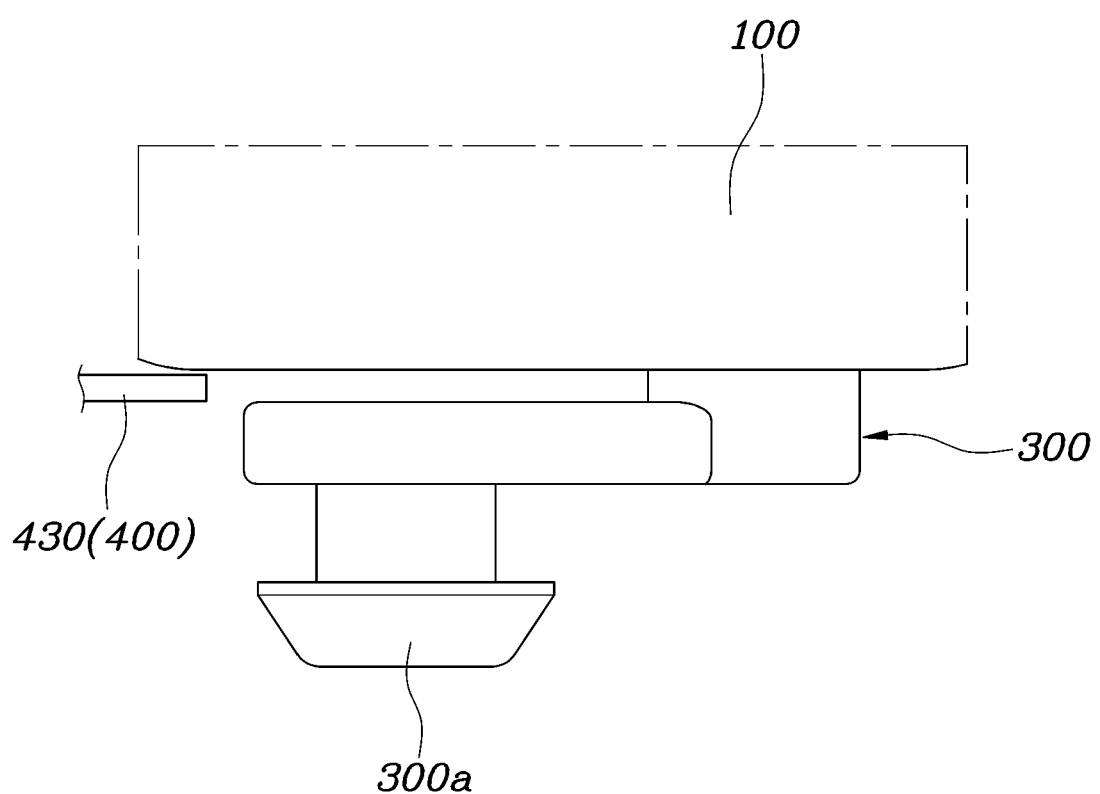
FIG. 2 is a view showing a lever arm and a debris removal unit of the inlet actuator according to embodiments of the present invention.
Figure 3:
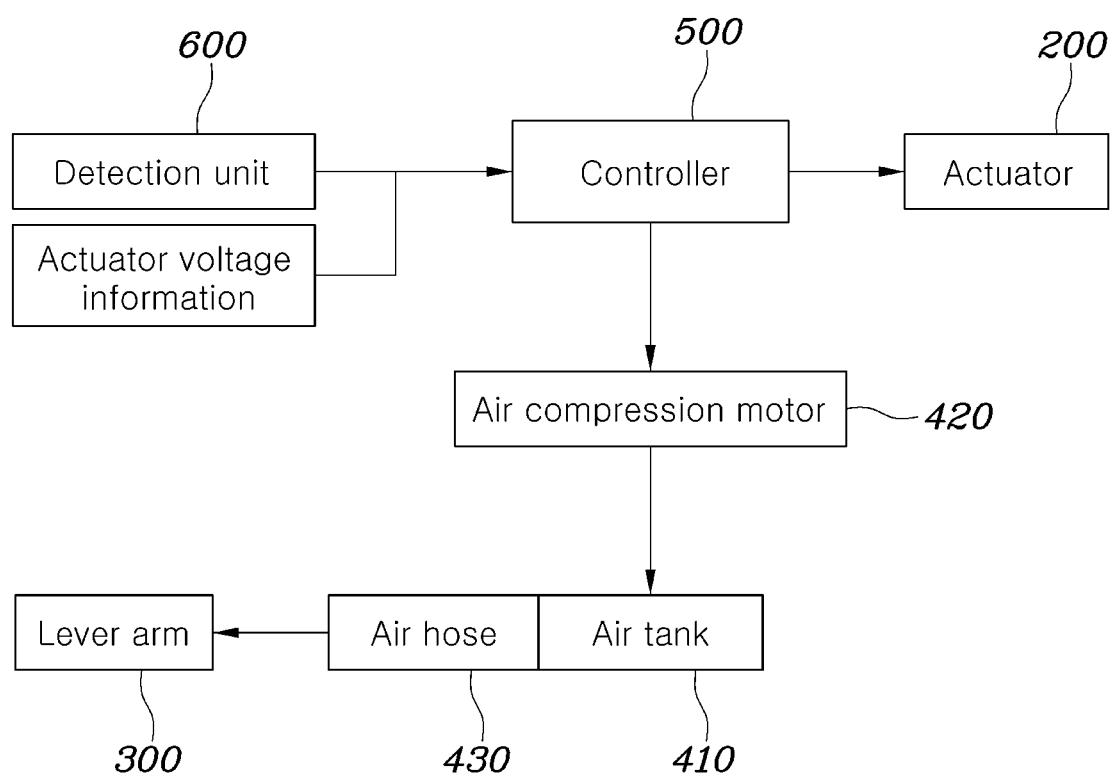
FIG. 3 is a block diagram showing an anti-sticking system of an inlet actuator according to embodiments of the present invention.
Figure 4:
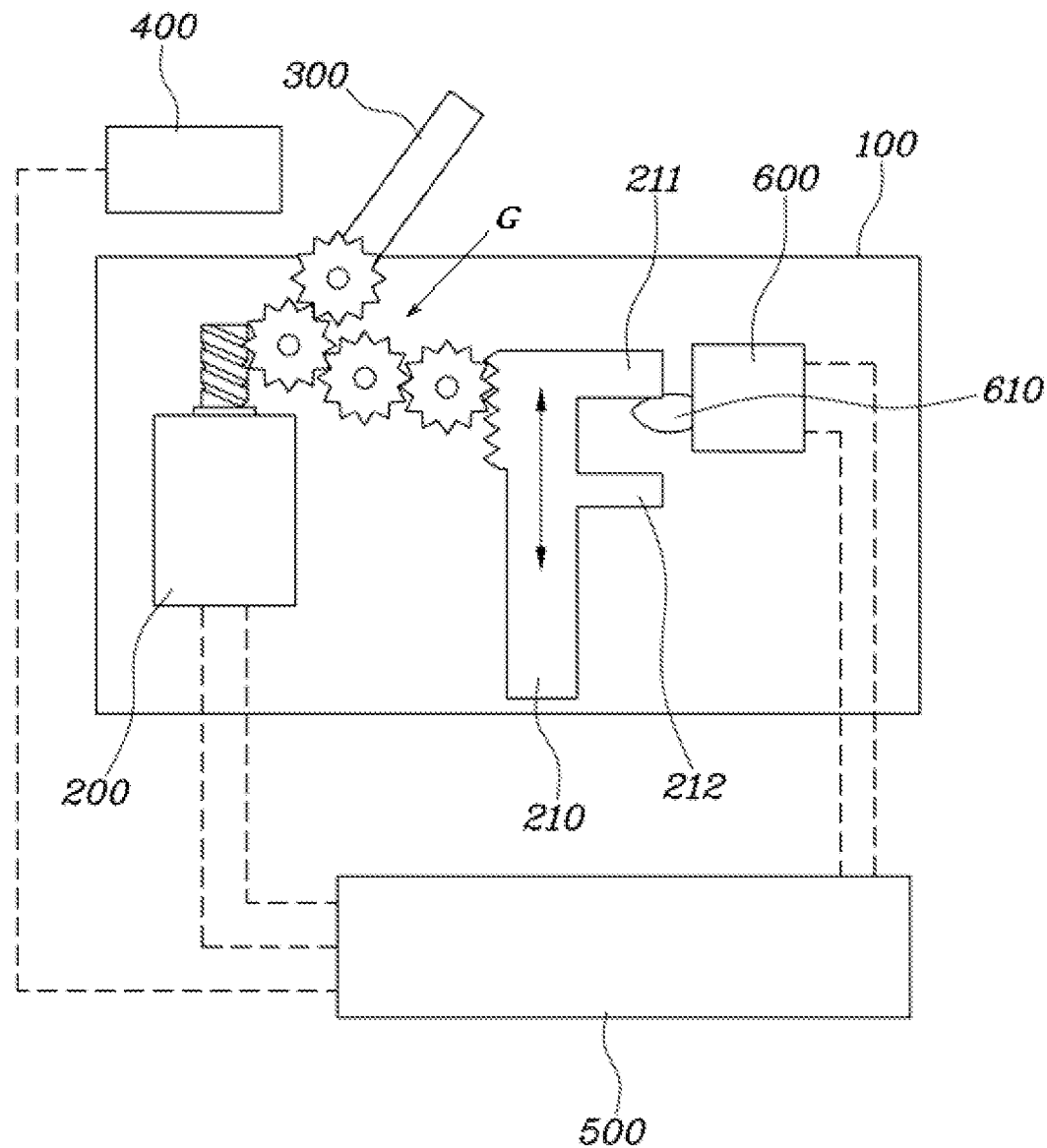
FIG. 4 is a view showing the anti-sticking system of the inlet actuator shown in FIG. 3.

FIG. 1 is a view showing an inlet actuator and an inlet body according to embodiments of the present invention. FIG. 2 is a view showing a lever arm and a debris removal unit of the inlet actuator according to embodiments of the present invention. FIG. 3 is a block diagram showing an anti-sticking system of an inlet actuator according to embodiments of the present invention. FIG. 4 is a view showing the anti-sticking system of the inlet actuator shown in FIG. 3.

As shown in FIGS. 1 to 4, the anti-sticking system of an inlet actuator according to embodiments of the present invention includes an actuator 200 mounted in a housing 100 and configured to be operated in response to a connection state of a charging cable, a lever arm 300 rotatably provided outside the housing 100 and configured to be rotated in conjunction with operation of the actuator 200, a debris removal unit 400 provided to remove debris generated on the lever arm 300, and a controller 500 controlling operation of the actuator 200 in response to connection or disconnection of the charging cable, when an operational state according to the operation of the actuator 200 deviates from a normal range, the controller controlling the debris removal unit 400 to remove the debris generated on the lever arm 300.

Herein, the housing 100 may be provided in a vehicle body, and the actuator 200 mounted in the housing 100 is selectively operated in response to a connection state of a charging plug, so that the connected charging plug may be locked or released.

Referring to FIG. 1, a locking pin 210 is connected to the actuator 200, and in response to a connection state of the actuator 200, the locking pin 210 is locked to or released to or from an inlet body L. Therefore, the inlet body L has a locking hole H into which the locking pin 210 is inserted. The locking pin 210 enters or retracts from the locking hole H in response to an operation state of the actuator 200 to prevent separation of the charging plug or to allow separation of the charging plug.

The locking pin 210 is connected to the actuator 200 by a medium of a gear unit G, thereby efficiently operating each component including the locking pin 210 which is driven by receiving power of the actuator 200.

The lever arm 300 is rotatably provided outside the housing 100, and the lever arm 300 is connected to the actuator 200 and rotated in conjunction with operation of the actuator 200. When the actuator 200 is broken down, the lever arm 300 is provided for manipulation to prevent separation of the charging plug or to allow separation of the charging plug in manual operation, and the lever arm 300 is provided outside the housing 100. Therefore, the lever arm 300 may include a locking part 300a to allow manual manipulation in a specific situation such as a breakdown of the actuator 200.

However, as the lever arm 300 is arranged outside the housing 100, a stuck situation due to the debris may occur. The stuck situation restrains movement of the lever arm 300 and thus a problem that prevents the actuator 200 from being normally driven may occur.

Therefore, the anti-sticking system of embodiments of the present invention includes the debris removal unit 400 to remove the debris generated on the lever arm 300. The debris removal unit 400 is configured to jet compressed air to the lever arm 300, so that the debris generated on the lever arm 300 is removed by the compressed air. The debris removal unit 400 includes an air tank 410, an air compression motor 420, and an air hose 430. The compressed air generated by the air compression motor 420 is stored in the air tank 410 provided in the mobility. The air hose 430 is extended from the air tank 410 to the lever arm 300 so that the compressed air in the air tank 410 may be supplied to the lever arm 300.

The debris removal unit 400 is controlled by the controller 500. In other words, the controller 500 controls operation of the actuator 200 in response to connection or disconnection of the charging cable and operation of the debris removal unit 400 to remove the debris generated on the lever arm 300.

Specifically, when an operational state in response to operation of the actuator 200 deviates from the normal range, the controller 500 controls the debris removal unit 400 so that the debris generated on the lever arm 300 is removed. In other words, considering the voltage applied to the actuator 200, a location of the locking pin 210, operation time, etc., the controller 500 may determine an operational state in response to operation of the actuator 200. When the operational state deviates from the normal range wherein the actuator 200 is normally operated, the controller 500 determines that the lever arm 300 is stuck by the debris not to be normally rotated. Therefore, when the controller 500 determines that the lever arm 300 is in a stuck state, the controller 500 operates the debris removal unit 400 so as to remove the debris generated on the lever arm 300, so that an operational state in response to operation of the actuator 200 is normalized.

As described above, the anti-sticking system of embodiments of the present invention does not require a separate cover provided to protect the lever arm 300, whereby the entire size thereof is reduced and maintenance convenience is improved with removal of a cover detachment process.

Embodiments of the present invention as described above may have various embodiments for checking a stuck state of the lever arm 300.

Specifically, according to embodiments of the present invention, a detection unit 600 may be provided in the housing 100 to detect a location of the locking pin 210.

In other words, the locking pin 210 is connected to the actuator 200 and the locking pin 210 is locked or released to or from the inlet body L in response to operation of the actuator 200. Herein, the detection unit 600 is provided in the housing 100 and detects a location to which the locking pin 210 is moved, thus determining an operational state in response to operation of the actuator 200 by using information according to a moved location or a moved time of the locking pin 210.

Specifically, the locking pin 210 includes a first detection contact part 211 and a second detection contact part 212 spaced apart from each other in a longitudinal direction thereof. the detection unit 600 includes a touch part 610 arranged between the first detection contact part 211 and the second detection contact part 212, and when the touch part 610 is brought into contact with the first detection contact part 211, the detection unit 600 detects that the locking pin 210 is located to be locked, and when touch part 610 is brought into contact with the second detection contact part 212, the detection unit 600 detects that the locking pin 210 is located to be released.

As described above, the housing 100 includes the detection unit 600 in a location adjacent to the locking pin 210, and as the first detection contact part 211 or the second detection contact part 212 is brought into contact with the touch part 610 of the detection unit 600 in response to a moved location of the locking pin 210, the detection unit 600 may collect the information according to a moved location and a moved time of the locking pin 210.

Therefore, when the locking pin 210 is moved in a locked direction and then the first detection contact part 211 is brought into contact with the touch part 610 of the detection unit 600, the detection unit 600 detects that the locking pin 210 is moved in the locked direction and transmits the information about the movement of the locking pin 210 to the controller 500. On the other hand, when the locking pin 210 is moved in a releasing direction and then the second detection contact part 212 is brought into contact with the touch part 610 of the detection unit 600, the detection unit 600 detects that the locking pin 210 is moved in the releasing direction and transmits the information about the movement of the locking pin 210 to the controller 500.

As described above, the detection unit 600 determines a location and a moved time of the locking pin 210 in response to a contact state of the locking pin 210, thereby ensuring the accuracy of the information in response to the location of the locking pin 210.

Meanwhile, the controller 500 presets the normal range at a normal time range in which the actuator 200 is in a normal operation state. In other words, the normal range preset in the controller 500 is provided to determine a stuck state of the lever arm 300 by using the information in response to a moved time, and is preset as the normal time range.

Therefore, when an operation time for the locking pin 210 to the locked state or the released state transmitted from the detection unit 600 deviates from the normal time range, the controller 500 determines that the lever arm 300 is stuck by the debris and normal rotating movement thereof is not performed. Therefore, the controller 500 controls the debris removal unit 400 so that the debris generated on the lever arm 300.

In other words, the normal time range may be a time from a point of time where the actuator 200 is driven in a normal operational state in response to operation of the actuator 200 to a point of time where intersecting between the first detection contact part 211 or the second detection contact part 212 and the touch part 610 of the detection unit 600 is detected. However, when the lever arm 300 is stuck by the debris, as rotation of the lever arm 300 is not efficiently performed, operation of the actuator 200 in conjunction with the lever arm 300 and movement of the locking pin 210 are affected.

Therefore, when the actuator 200 is driven, the controller 500 determines that the lever arm 300 is stuck by the debris and is not efficiently rotated when the operation time for the locking pin 210 to be locked or released transmitted from the detection unit 600 deviates from the normal time range. Therefore, the controller 500 controls the debris removal unit 400 to remove the debris generated on the lever arm 300.

Furthermore, when the detection unit 600 detects that the operation time for the locking pin 210 to reach the locked or released state deviates from the normal time range, the controller 500 generates a warning message. In other words, the controller 500 informs a driver that the operational state of the actuator 200 is abnormal by using a cluster in the mobility or sending a warning sound. Therefore, the driver recognizes operation of the debris removal unit 400 due to the lever arm 300 stuck due to the debris, so that discomfort according to the operation of the debris removal unit 400 is avoided.

Meanwhile, when the detection unit 600 detects that the operation time for the locking pin 210 to reach the locked or released state deviates from the normal time range, the controller 500 controls the debris removal unit 400 so that the operation of the debris removal unit 400 is increased in response to the time outside the normal time range.

As described above, the controller 500 increases the operation of the debris removal unit 400 by the extent of time outside the normal time range, thereby efficiently removing the debris generated on the lever arm 300.

For example, the controller 500 may gradually increase the operation of the debris removal unit 400 as the operation time deviates from the normal time range. In other words, when the operation time deviates from the normal time range by 10% or more from a predetermined level, the controller 500 controls the debris removal unit 400 so that the debris removal unit 400 is operated at step 1, and when the operation time deviates from the normal time range by 20% or more from the predetermined level, the controller 500 controls the debris removal unit 400 so that the debris removal unit 400 is operated at step 2, and when the operation time deviates from the normal time range by 30 or more from the predetermined level, the controller 500 controls the debris removal unit 400 so that the debris removal unit 400 is operated at step 3.

As another embodiment, the controller 500 calculates the operation of the debris removal unit 400 in real time in response to the extent of operation time outside the normal time range to determine the operation of the debris removal unit 400.

As described above, the debris removal unit 400 may efficiently remove the debris generated on the lever arm 300 as the operation is adjusted.

Meanwhile, the controller 500 presets a normal range as a normal voltage range of the actuator 200 in the normal operation state, and a voltage value applied when the actuator 200 is driven is input. When the voltage value deviates from the normal voltage range, the controller 500 controls the debris removal unit 400 so as to remove the debris generated on the lever arm 300.

Herein, the controller 500 may receive the voltage applied to the actuator by using an electronic component such as an inverter.

As described above, when the voltage value applied when the actuator 200 is driven deviates from the normal voltage range, the controller 500 determines that the lever arm 300 is stuck by the debris. Therefore, the controller 500 controls the debris removal unit 400 so that the debris generated on the lever arm 300 is removed.

In other words, when the operation state in response to operation of the actuator 200 is in the normal state, the normal voltage range may be the voltage applied when the actuator 200 is driven in response to the connection state of the charging cable. However, when the lever arm 300 is stuck by the debris, as the lever arm 300 is not efficiently rotated, a load is applied to operation of the actuator 200 operated in conjunction with the lever arm 300 and the voltage for operating the actuator 200 may be increased.

Therefore, when the voltage applied when the actuator 200 is driven deviates from the normal voltage range, the controller 500 determines that the lever arm 300 is stuck by the debris and normal rotation is not performed. Therefore, the controller 500 controls the debris removal unit 400 to remove the debris generated on the lever arm 300.

Meanwhile, when a voltage value deviates from the normal voltage range, the controller 500 increases the operation of the debris removal unit 400 in response to the voltage value outside the normal voltage range.

As described above, the controller 500 increases the operation of the debris removal unit 400 by the extent of voltage outside the normal voltage range, thereby efficiently removing the debris generated on the lever arm 300.

For example, as the voltage applied when the actuator 200 is driven deviates from the normal voltage range, the controller 500 may gradually increase the operation of the debris removal unit 400. In other words, when voltage applied to the actuator 200 deviates from the normal voltage range by 10% or more from a predetermined level, the controller 500 controls the debris removal unit 400 so that the debris removal unit 400 is operated at the step 1, and when voltage applied to the actuator 200 deviates from the normal voltage range by 20% or more from the predetermined level, the controller 500 controls the debris removal unit 400 so that the debris removal unit 400 is operated at the step 2, and when voltage applied to the actuator 200 deviates from the normal voltage range by 30% or more from the predetermined level, the controller 500 controls the debris removal unit 400 so that the debris removal unit 400 is operated at the step 3.

As another embodiment, the controller 500 calculates the operation of the debris removal unit 400 in real time in response to the extent of the voltage applied to the actuator 200 outside the normal voltage range to determine the operation of the debris removal unit 400.

Meanwhile, when the operational state according to operation of the actuator 200 deviates from the normal range after the debris removal unit 400 is operated, the controller 500 sends a warning message so that inspection is performed for the components including the lever arm 300.

In other words, through the cluster in the mobility or sending the warning sound, the controller 500 informs the driver that the debris generated on the lever arm 300 is not removed even when the debris removal unit 400 is operated. Accordingly, the driver recognizes that the inlet actuator may operate abnormally to perform inspection and repair.

According to the anti-sticking system of the actuator 200 having the structure described above, when the actuator 200 provided to lock or release the charging plug is broken down, the lever arm 300 exposed outside the housing 100 performs a locking or releasing operation of the charging plug. Specifically, as the debris generated between the lever arm 300 and the housing 100 is removed, sticking due to the debris is prevented and an inoperable situation of the inlet actuator is prevented.

Although the preferred embodiments of the present invention have been disclosed for illustrative purposes, those skilled in the art will appreciate that various modifications, additions, and substitutions are possible, without departing from the spirit and scope of the present invention.

What is claimed is:

1. A system comprising:
   an actuator mounted in a housing and configured to be operated in response to a connection state of a charging cable;
   a lever arm rotatably provided outside the housing and configured to be rotated in conjunction with operation of the actuator;
   a debris removal unit configured to remove debris on the lever arm; and
   a controller configured to:
      control the operation of the actuator in response to the connection state of the charging cable being a connected state or a released state; and
      control the debris removal unit to remove the debris on the lever arm in response to an operational state according to the operation of the actuator deviating from a normal range.

2. The system of claim 1, wherein the debris removal unit is configured to jet compressed air to the lever arm.

3. The system of claim 1, wherein the controller is configured to:
   preset the normal range as a normal voltage range in a normal operational state of the actuator;
   input a voltage value applied in the operation of the actuator; and
   control the debris removal unit to remove the debris on the lever arm in response to the voltage value deviating from the normal voltage range.

4. The system of claim 3, wherein the controller is configured to control the debris removal unit to increase operation of the debris removal unit in response to the voltage value being outside the normal voltage range.

5. The system of claim 1, wherein the controller is configured to send a warning message to perform an inspection including the lever arm in response to the operational state according to the operation of the actuator after the debris removal unit is operated deviating from the normal range.

6. A system comprising:
an actuator mounted in a housing and configured to be operated in response to a connection state of a charging cable;
a lever arm rotatably provided outside the housing and configured to be rotated in conjunction with operation of the actuator;
a debris removal unit configured to remove debris on the lever arm;
a locking pin connected to the actuator, wherein the locking pin is configured to be locked to or released from an inlet body in response to the operation of the actuator;
a detection unit provided in the housing and configured to detect a location of the locking pin; and
a controller configured to:
control the operation of the actuator in response to the connection state of the charging cable being in a connected state or a released state; and
control the debris removal unit to remove the debris on the lever arm in response to an operational state according to the operation of the actuator deviating from a normal range.

7. The system of claim 6, wherein:
the locking pin comprises a first detection contact part and a second detection contact part that are spaced apart from each other in a longitudinal direction of the locking pin; and
the detection unit comprises a touch part arranged between the first detection contact part and the second detection contact part;
wherein, in response to the touch part being brought into contact with the first detection contact part, the detection unit is configured to detect that the locking pin is positioned to be locked to the inlet body; and
wherein, in response to the touch part being brought into contact with the second detection contact part, the detection unit is configured to detect that the locking pin is positioned to be released from the inlet body.

8. The system of claim 6, wherein the controller is configured to:
preset the normal range of the operational state as a normal time range at a normal operational state of the actuator; and
control the debris removal unit to remove the debris on the lever arm in response to a determination by the detection unit that an operation time for the locking pin to reach a locked state or a releasing state deviates from the normal time range.

9. The system of claim 6, wherein the controller is configured to generate a warning message in response to a determination by the detection unit that an operation time for the locking pin to reach a locked state or a releasing state deviates from a normal time range.

10. The system of claim 6, wherein the controller is configured to control the debris removal unit to increase operation of the debris removal unit in response to a determination by the detection unit that an operation time for the locking pin to reach a locked state or a releasing state deviates from a normal time range.

11. A vehicle comprising:
a vehicle body;
a housing provided in the vehicle body;
an actuator mounted in the housing and configured to be operated in response to a connection state of a charging cable;
a lever arm rotatably provided outside the housing and configured to be rotated in conjunction with operation of the actuator;
a debris removal unit configured to remove debris on the lever arm; and
a controller configured to:
control the operation of the actuator in response to the connection state of the charging cable being in a connected state or a released state; and
control the debris removal unit to remove the debris on the lever arm in response to an operational state according to the operation of the actuator deviating from a normal range.

12. The vehicle of claim 11, wherein the debris removal unit comprises an air tank, an air hose, and an air compression motor, and wherein the debris removal unit is configured to jet compressed air stored in the air tank to the lever arm via the air hose.

13. The vehicle of claim 11, further comprising:
a locking pin connected to the actuator, wherein the locking pin is configured to be locked to or released from an inlet body in response to the operation of the actuator; and
a detection unit provided in the housing and configured to detect a location of the locking pin.

14. The vehicle of claim 13, wherein:
the locking pin comprises a first detection contact part and a second detection contact part that are spaced apart from each other in a longitudinal direction of the locking pin; and
the detection unit comprises a touch part arranged between the first detection contact part and the second detection contact part;
wherein, in response to the touch part being brought into contact with the first detection contact part, the detection unit is configured to detect that the locking pin is positioned to be locked to the inlet body; and
wherein, in response to the touch part being brought into contact with the second detection contact part, the detection unit is configured to detect that the locking pin is positioned to be released from the inlet body.

15. The vehicle of claim 13, wherein the controller is configured to:
preset the normal range of the operational state as a normal time range at a normal operational state of the actuator; and
control the debris removal unit to remove the debris on the lever arm in response to a determination by the detection unit that an operation time for the locking pin to reach a locked state or a releasing state deviates from the normal time range.

16. The vehicle of claim 13, wherein the controller is configured to generate a warning message in response to a determination by the detection unit that an operation time for the locking pin to reach a locked state or a releasing state deviates from a normal time range.

17. The vehicle of claim 13, wherein the controller is configured to control the debris removal unit to increase operation of the debris removal unit in response to a determination by the detection unit that an operation time for the locking pin to reach a locked state or a releasing state deviates from a normal time range.

18. The vehicle of claim 11, wherein the controller is configured to:
preset the normal range as a normal voltage range in a normal operational state of the actuator;

input a voltage value applied in the operation of the actuator; and control the debris removal unit to remove the debris on the lever arm in response to the voltage value deviating from the normal voltage range.

19. The vehicle of claim 18, wherein the controller is configured to control the debris removal unit to increase operation of the debris removal unit in response to the voltage value being outside the normal voltage range.

20. The vehicle of claim 11, wherein the controller is configured to send a warning message to perform an inspection including the lever arm in response to the operational state according to the operation of the actuator after the debris removal unit is operated deviating from the normal range.

* * * * *